(12) United States Patent
Kanakarajan et al.

(10) Patent No.: US 9,135,352 B2
(45) Date of Patent: Sep. 15, 2015

(54) SYSTEM AND METHOD FOR PROVIDING TARGETED ADVERTISING THROUGH TRAFFIC ANALYSIS IN A NETWORK ENVIRONMENT

(75) Inventors: Ravindranath C. Kanakarajan, Karnataka (IN); Praveen Bhamidipati, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 338 days.

(21) Appl. No.: 12/793,545

(22) Filed: Jun. 3, 2010

(65) Prior Publication Data

US 2011/0302026 A1 Dec. 8, 2011

(51) Int. Cl.
| | |
|---|---|
| G06Q 30/00 | (2012.01) |
| G06F 17/30 | (2006.01) |
| G06Q 30/02 | (2012.01) |
| H04L 29/08 | (2006.01) |
| H04L 29/06 | (2006.01) |

(52) U.S. Cl.
CPC ............ *G06F 17/3087* (2013.01); *G06Q 30/02* (2013.01); *G06Q 30/0246* (2013.01); *G06Q 30/0261* (2013.01); *H04L 67/18* (2013.01); *H04L 67/2819* (2013.01); *H04L 63/101* (2013.01)

(58) Field of Classification Search
USPC ............ 705/14.49, 14.5, 14.51, 14.57, 14.58, 705/14.64
See application file for complete search history.

(56) References Cited

U.S. PATENT DOCUMENTS

| | | | | |
|---|---|---|---|---|
| 5,251,205 A | * | 10/1993 | Callon et al. | 370/392 |
| 5,310,999 A | * | 5/1994 | Claus et al. | 235/384 |
| 5,446,891 A | | 8/1995 | Kaplan et al. | |
| 5,481,294 A | | 1/1996 | Thomas et al. | |
| 5,572,643 A | * | 11/1996 | Judson | 709/218 |

(Continued)

FOREIGN PATENT DOCUMENTS

| | | |
|---|---|---|
| CN | 101034455 A | 9/2007 |
| EP | 0837583 | 4/1998 |

(Continued)

OTHER PUBLICATIONS

Gutzmann, "Access Control and Session Management in the HTTP Environment" (IEEE Internet Computing, Jan.-Feb. 2001).*

(Continued)

*Primary Examiner* — John G Weiss
*Assistant Examiner* — Scott C Anderson
(74) *Attorney, Agent, or Firm* — Patent Capital Group (57) ABSTRACT

An example method includes receiving packets associated with network traffic and identifying location information associated with an end user related to the network traffic. The method also includes extracting keywords from the network traffic, the keywords and the location information are used as a basis for rendering an advertisement on digital signage that is physically proximate to a current location of the end user. In other embodiments, the network traffic can be matched against access control lists, which are configured with Internet protocol (IP) addresses relating to search engines. Additionally, the network traffic can be classified based on fields in the packets, wherein the fields include a source Internet protocol (IP) address, a destination IP address, and a transmission control protocol (TCP) port. In more particular embodiments, the network traffic is hypertext transfer protocol (HTTP) requests originating from a handheld device operated by the end user.

23 Claims, 4 Drawing Sheets

(56) References Cited

U.S. PATENT DOCUMENTS

| | | | |
|---|---|---|---|
| 5,724,567 A | 3/1998 | Rose et al. | |
| 5,983,214 A | 11/1999 | Lang et al. | |
| 6,182,068 B1 | 1/2001 | Culliss | |
| 6,453,345 B2 | 9/2002 | Trcka et al. | |
| 6,493,703 B1* | 12/2002 | Knight et al. | 1/1 |
| RE38,600 E | 9/2004 | Mankovitz | |
| 6,873,258 B2 | 3/2005 | Marples et al. | |
| 7,379,992 B2* | 5/2008 | Tung | 709/223 |
| 7,386,517 B1* | 6/2008 | Donner | 705/75 |
| 7,415,516 B1 | 8/2008 | Gits et al. | |
| 7,573,833 B2 | 8/2009 | Pirzada et al. | |
| 7,586,877 B2 | 9/2009 | Gits et al. | |
| 7,752,190 B2* | 7/2010 | Skinner | 707/706 |
| 7,853,967 B2 | 12/2010 | Yoon et al. | |
| 7,975,283 B2 | 7/2011 | Bedingfield, Sr. | |
| 8,180,396 B2 | 5/2012 | Athsani et al. | |
| 8,259,692 B2 | 9/2012 | Bajko | |
| 8,265,652 B2 | 9/2012 | Piersol et al. | |
| 2002/0050927 A1 | 5/2002 | DeMoerloose et al. | |
| 2003/0110485 A1 | 6/2003 | Lu et al. | |
| 2005/0075116 A1 | 4/2005 | Laird et al. | |
| 2005/0114788 A1 | 5/2005 | Fabritius | |
| 2005/0139672 A1 | 6/2005 | Johnson et al. | |
| 2005/0216572 A1* | 9/2005 | Tso et al. | 709/218 |
| 2006/0256001 A1 | 11/2006 | Markhovsky et al. | |
| 2007/0069923 A1 | 3/2007 | Mendelson | |
| 2007/0136133 A1* | 6/2007 | Li | 705/14 |
| 2008/0021777 A1* | 1/2008 | Mack et al. | 705/14 |
| 2008/0050111 A1 | 2/2008 | Lee et al. | |
| 2008/0065759 A1 | 3/2008 | Gassewitz | |
| 2008/0098305 A1 | 4/2008 | Beland | |
| 2008/0122871 A1 | 5/2008 | Guday | |
| 2008/0147601 A1* | 6/2008 | Chapus et al. | 707/3 |
| 2008/0163207 A1* | 7/2008 | Reumann et al. | 718/1 |
| 2008/0215428 A1* | 9/2008 | Ramer et al. | 705/14 |
| 2008/0252527 A1 | 10/2008 | Garcia | |
| 2008/0262929 A1* | 10/2008 | Behr | 705/14 |
| 2009/0037239 A1* | 2/2009 | Wong et al. | 705/7 |
| 2009/0132823 A1 | 5/2009 | Grimen et al. | |
| 2009/0143972 A1 | 6/2009 | Kitamura et al. | |
| 2009/0144157 A1 | 6/2009 | Saracino et al. | |
| 2009/0150918 A1 | 6/2009 | Wu et al. | |
| 2010/0008337 A1 | 1/2010 | Bajko | |
| 2010/0121567 A1 | 5/2010 | Mendelson | |
| 2010/0214111 A1 | 8/2010 | Schuler et al. | |
| 2010/0223114 A1 | 9/2010 | Yao et al. | |
| 2010/0279665 A1 | 11/2010 | Hardin et al. | |
| 2010/0304766 A1 | 12/2010 | Goyal | |
| 2011/0060808 A1 | 3/2011 | Martin et al. | |
| 2011/0062230 A1 | 3/2011 | Ward et al. | |
| 2011/0099590 A1 | 4/2011 | Kim et al. | |
| 2011/0141254 A1 | 6/2011 | Roebke et al. | |
| 2012/0007713 A1 | 1/2012 | Nasiri et al. | |
| 2012/0072950 A1 | 3/2012 | Wu | |
| 2012/0095812 A1 | 4/2012 | Stefik et al. | |
| 2012/0113138 A1 | 5/2012 | Uusitalo et al. | |
| 2012/0135746 A1 | 5/2012 | Mohlig et al. | |
| 2012/0178431 A1 | 7/2012 | Gold | |
| 2012/0208521 A1 | 8/2012 | Hager et al. | |
| 2012/0210250 A1 | 8/2012 | Svendsen et al. | |
| 2012/0233687 A1 | 9/2012 | Metivier et al. | |
| 2012/0284012 A1 | 11/2012 | Rodriguez et al. | |

FOREIGN PATENT DOCUMENTS

| | | |
|---|---|---|
| EP | 1199899 A1 | 4/2002 |
| EP | 2067342 | 6/2009 |
| EP | 2577942 | 4/2013 |
| GB | 2326053 | 12/1998 |
| WO | WO 9808314 | 2/1998 |
| WO | WO 0022860 | 4/2000 |
| WO | WO2006/053275 | 5/2006 |
| WO | WO 2008/032297 | 3/2008 |
| WO | WO2011/153222 | 12/2011 |
| WO | WO 2011/153222 | 12/2011 |

OTHER PUBLICATIONS

Information Sciences Institute, University of Southern California, "RFC 793: Transmission Control Protocol—DARPA Internet Program Protocol Specification", prepared for Defense Advanced Research Projects Agency, now maintained by the Internet Engineering Task Force, Sep. 1981.*

Horowitz, "What does your IP address say about you?", CNET News, Sep. 15, 2008.*

PCT Oct. 11, 2011 Transmittal of the International Search Report and Written Opinion of the International Searching Authority from PCT/US2011/038735; 14 pages.

U.S. Appl. No. 12/396,124, filed Mar. 2, 2009, entitled "Digital Signage Proof of Play," Inventor(s): Robert M. Brush et al.

U.S. Appl. No. 12/642,796, filed Dec. 19, 2009, entitled "System and Method for Evaluating Content in a Digital Signage Environment," Inventors: Sridhar Acharya, et al.

U.S. Appl. No. 12/925,966, filed Nov. 3, 2010, entitled "Identifying Location Within a Building Using a Mobile Device," Inventor(s): Peter Michael Gits, et al.

U.S. Appl. No. 13/165,123, filed Jun. 21, 2011, entitled "Managing Public Resources," Inventor(s): Dale Seavey, et al.

U.S. Appl. No. 13/300,409, filed Nov. 18, 2011, entitled "System and Method for Generating Proof of Play Logs in a Digital Signage Environment," Inventors: Sriramakrishna Yelisetti, et al.

U.S. Appl. No. 13/165,000, filed Jun. 21, 2010, entitled "Delivering Wireless Information Associating to a Facility," Inventor(s) Peter Michael Gits, et al.

U.S. Appl. No. 13/335,078, filed Dec. 22, 2011, entitled, "System and Method for Providing Proximity-Based Dynamic Content in a Network Environment," Inventor(s): Peter Michael Gits, et al.

USPTO Jan. 18, 2012 Non-Final Office Action from U.S. Appl. No. 12/642,796.

USPTO Apr. 18, 2012 Response to Jan. 18, 2012 Non-Final Office Action from U.S. Appl. No. 12/642,796.

EPO May 2, 2001 European Search Report from Application No. EP00440277; 2 pages.

PCT—Jul. 2, 2007 International Search Report from PCT/US05/41114; 2 pages.

PCT—Jul. 17, 2007 International Preliminary Report on Patentability and the Written Opinion of the International Searching Authority from PCT/US05/41114.

"3D Drawing in Augmented Reality," posted by String, Digital Graffiti on vimeo.com; [printed Dec. 1, 2011] 2 pages http://vimeo.com/groups/digitalgraffiti/videos/1.5935674.

"Akoo Bridges Digital and Cell Phone Screens," Blog at WordPress.com [printed on Oct. 24, 2011] 4 pages; http://screenmedia.wordpress.com/2008/02/25/akoo-bridges-digital-and-cell-phonescreens.

Broadband, "Ask DSLReports.com: What is NebuAD?," Feb. 12, 2008, retrieved and printed Jun. 3, 2010, 17 pages; http://www.dslreports.com/shownews/Ask-DSLReportscom-What-Is-NebuAD-91797.

Wikipedia, "NebuAd," retrieved and printed Jun. 3, 2010, 11 pages; http://en.wikipedia.org/wiki/NebuAd.

Phorm, Inc., "Consumers Publishers & Networks Advertisers & Agencies ISPs: A personalised internet experience," retrieved and printed Jun. 3, 2010, 2 pages; http://www.phorm.com/.

USPTO May 2, 2012 Final Office Action from U.S. Appl. No. 12/642,796.

Ranveer, Chandra, et al., "Beacon Stuffing, WiFi without Associations," Powerpoint Presentation, [Printed on Dec. 5, 2011] 20 pages http://www.google.com/url?sa=t&rct=j&q=&esrc=s&source=web&cd=5&ved=0CEYQFjAE&url=http%3A%2F%2Fresearch.microsoft.com%2Fen-us%2Fprojects%2Fwifiads%2FbeaconstuffinghotmobileppFt&ei=6sm6TrCDEYmpi2AK8hcGBBQ&usg=AFQjCNFQbxbGV5KvqjswK3ODTUwumRFvJQ.

(56) References Cited

OTHER PUBLICATIONS

"iPhone Opens Hotel Doors—OpenWays Presents its iPhone Application to Bypass Front Desks and Open Room Locks," Hotel News Resource, Mar. 2, 2010, 2 pages. http://www.hotelnewsresource.com/article44075.html.
"Nearest Tube Augmented Reality App for iPhone 3GS from acrossair," video uploaded to YouTube by acrossair on Jul. 6, 2009, 2 pages http://www.youtube.com/watch?v=U2uH-jrsSxs.
"Tonchidot Announces the Launch of Sekai Camera," A Social Augmented Reality App for iPhone, posted by whatz in WhatAboutMacs forum, [printed Dec. 5, 2011], 2 pages http://forums.whataboutmac.com/topic.php?id=1164.
Cayin Technology Co., Ltd., "Interactive Digital Signage—Integration with Touch Screen & Mobile Devices," [printed Oct. 24, 2011] 2 pages http://cayintech.com/digital_signage_solutions/interactive_digital_signage.
Cayin Technology Co., Ltd., "SMP-WEB4 Web-Based Digital Signage Media Player," Product Information and Brochure; [printed Dec. 1, 2011] 4 pages http://cayintech.com/digital_signage_products/digital_signage_player.
Digital Signage Companies, "Company Showcase," DigitalSignageToday.com, 4 pages, [Retrieved and printed Apr. 23, 2012] http://www.digitalsignagetoday.com/showcases.php.
POPAI, "Digital Signage Network Playog Standards," Version 1.1, POPAI Digital Signage Standards Committee, William Wu, Editor-in-Chief, Aug. 23, 2006, 17 pages; http://www.popai.com/docs/DS/POPAI%20Digital%20Signage%20Playlog%20Standard%20-%20Version1.1a.pdf.
Anderson, Steve, "Smartphone as Hotel Room Key?" TFTs High Tech News Portal, Nov. 2, 2010, 6 pages http://nexus404.com/Blog/2010/11/02/smartphone-as-hotel-room-key-assa-abloy-swedish-door-opening-company-working-on-nfe-smartphone-enabled-door-keys/.
Axis Communications, "Security Capabilities," www.axis.com/products/video/about_networkvideo/security_capabilities.htm; printed Dec. 14, 2009; 1 page.
Blass, Evan, "Apple patent embeds thousands of cameras among LCD pixels," http://www.engadget.com/2006/04/26/apple-patent-embeds-thousands-of-cameras-among-lcd-pixels; Apr. 26, 2006; 1 page.
Burfordon, Ben, "Third day in Rio—part 3, Sugarloaf," http://www.davisdenny.com/bensblog/2008/11/third-day-in-riopart-3-sugarlo.html; Nov. 17, 2008; 29 pages.
USPTO Apr. 25, 2013 Non-Final Office Action from U.S. Appl. No. 13/300,409.
"Cisco Digital Signs," Cisco Digital Media Manager, cisco.com; 2 pages; [Retrieved and printed Sep. 12, 2012] http://www.cisco.com/en/USprod/video/ps9339/ps6681/digital_signs.html.
Duryee, Tricia, "Mobile Maps are Moving Indoors to Pinpoint Specific Items on Store Shelves," mocoNews.net, Aug. 25, 2010, 1 page http://moconews.net/article/419-mobile-maps-are-moving-indoors-to-help-navigate-within-stores-airports/.
Eaton, Kit, "Foursquare's Digital Graffiti, a Legally Nerve-Wracking Taste of the Future," FastCompany.com, Apr. 2, 2010, 2 pages; http://www.fastcompany.com/1605224/foursquare-virtual-graffiti-geotagging-tagsaugmented-reality-lbs.
Grove, Joseph and Bill Yackey, "Digital Signage Expo Featured Exhibitors: The hardware providers," www.digitalsignagetoday.com/article.php?id=21812; Mar. 4, 2009; 3 pages.
Nuva Technology, Inc., "AVITAR DSN Software Solution," www.nuvatech.com/avitar.html; printed Dec. 14, 2009; 2 pages.
Parisien, Daniel "The Dirty Little Secret of Digital Signage: Proof of Play vs. Audited Proof of Display," http://blog.broadsign.com/digitalsignagedigest/index.php/2007/10/19/the-dirty-little-secret-of-digital-signage-proof-of-play-vs-audited-proof-of-display; Oct. 19, 2007; 5 pages.
PCT Dec. 4, 2012 International Preliminary Report on Patentability from PCT/US2011/038735; 7 pages.
Richardson, Iain, "An Overview of H.264 Advanced Video Coding," Vcodex/OneCodec White Paper, Jan. 2011, © Iain Richardson/Vcodex, Ltd. 2007-2011; 7 pages http://www.vcodex.com/files/H.264overview_Jan11.pdf.
Richardson, Iain, "H.264/AVC Loop Filter," Vcodex White Paper, © Iain Richardson/Vcodex, Ltd. 2002-2011; 3 pages; http://www.vcodex.com/files/H264_loopfilter_wp.pdf.
Richardson, Iain, "Introduction to Image and Video Coding," © Iain Richardson/Vcodex, Ltd. 2001-2002; 35 pages; http://www.vcodex.com/files/videocoding_intro_1.pdf.
Richardson, Iain, "Video Coding Walk-Through," White Paper, © Iain Richardson/Vcodex, Ltd. 2011; 10 pages.
Webster, Melissa, "Retail IT Meets Video: Cisco Makes Digital Signage Play Over the Network," Cisco White Paper; Jul. 2007; 14 pages http://www.cisco.com/en/US/solutions/collateral/ns340/ns394/ns158/ns620/net_implementation_white_paper0900aecd806b8c04.pdf.
USPTO Aug. 2, 2012 RCE Response to May 2, 2012 Final Office Action from U.S. Appl. No. 12/642,796.
USPTO Feb. 19, 2013 Non-Final Office Action from U.S. Appl. No. 12/642,796.
USPTO Mar. 13, 2013 Non-Final Office Action from U.S. Appl. No. 13/165,000.
USPTO Nov. 28. 2012 Non-Final Office Action from U.S. Appl. No. 13/165,123.
USPTO Feb. 28, 2013 Response to Non-Final Office Action mailed Nov. 28, 2012 from U.S. Appl. No. 13/165,123.
USPTO Mar. 25, 2013 Notice of Allowance from U.S. Appl. No. 13/165,123.
Jul. 2, 2013 Response to Communication from European Application No. 11725843.
USPTO Jul. 10, 2013 Final Office Action from U.S. Appl. No. 13/165,000.
USPTO Oct. 9, 2013 RCE Response to Jul. 10, 2013 Final Office Action from U.S. Appl. No. 13/165,000.
USPTO Jul. 12, 2013 Notice of Allowance from U.S. Appl. No. 13/165,123.
USPTO Sep. 17, 2013 Final Office Action from U.S. Appl. No. 13/300,409.
USPTO Jul. 12, 2013 Non-Final Office Action from U.S. Appl. No. 13/335,078.
USPTO Jul. 31, 2013 Response to Jul. 12, 2013 Non-Final Office Action from U.S. Appl. No. 13/335,078.
USPTO May 20, 2013 Response to Feb. 19, 2013 Non-Final Office Action from U.S. Appl. No. 12/642,796.
USPTO Jun. 3, 2013 Notice of Allowance from U.S. Appl. No. 12/642,796.
USPTO Jun. 12. 2013 Response to Mar. 13, 2013 Non-Final Office Action from U.S. Appl. No. 13/165,000.
USPTO Jun. 25, 2013 Request for Continued Examination Response to Mar. 25, 2013 Notice of Allowance from U.S. Appl. No. 13/165,123.
USPTO Jun. 24, 2013 Response to Apr. 25, 2013 Non-Final Office Action from U.S. Appl. No. 13/300,409.
USPTO Feb. 21, 2014 Non-Final Office Action from U.S. Appl. No. 13/300,409.
USPTO Nov. 8, 2013 Final Office Action from U.S. Appl. No. 13/335,078.
USPTO Apr. 2, 2014 Notice of Allowance from U.S. Appl. No. 13/335,078.
PRC Sep. 3, 2014 SIPO $1^{st}$ Office Action from Chinese Application Serial No. 201180027432.6; 43 pages.
USPTO Sep. 18, 2014 Non-Final Office Action from U.S. Appl. No. 13/300,409.
USPTO Jan. 23, 2015 Non-Final Office Action from U.S. Appl. No. 13/165,000.
USPTO Apr. 2, 2015 Final Office Action from U.S. Appl. No. 13/300,409.

* cited by examiner

FIG. 1

SYSTEM AND METHOD FOR PROVIDING TARGETED ADVERTISING THROUGH TRAFFIC ANALYSIS IN A NETWORK ENVIRONMENT

TECHNICAL FIELD

This disclosure relates in general to the field of communications and, more particularly, to providing targeted advertising through traffic analysis in a network environment.

BACKGROUND

Advertising architectures have grown increasingly complex in communication environments. As advertising technologies increase in sophistication, proper coordination and efficient management of advertising content becomes critical. Typically, advertisers seek to distribute advertising content from various locations. In many instances, such content is universally broadcast to entire groups of people. The ability to properly manage advertising resources and, further, to efficiently deliver content presents a significant challenge to system designers, component manufacturers, advertising agencies, network owners/operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving packets associated with network traffic and identifying location information associated with an end user related to the network traffic. The method also includes extracting keywords from the network traffic, the keywords and the location information are used as a basis for rendering an advertisement on digital signage that is physically proximate to a current location of the end user. In other embodiments, the network traffic can be matched against access control lists, which are configured with Internet protocol (IP) addresses relating to search engines.

In yet other embodiments, the network traffic can be classified based on fields in the packets, wherein the fields include a source Internet protocol (IP) address, a destination IP address, and a transmission control protocol (TCP) port. In more particular embodiments, the network traffic is hypertext transfer protocol (HTTP) requests originating from a handheld device operated by the end user, and demographic data associated with the end user is identified in the network traffic.

Example Embodiments

Figure 1:
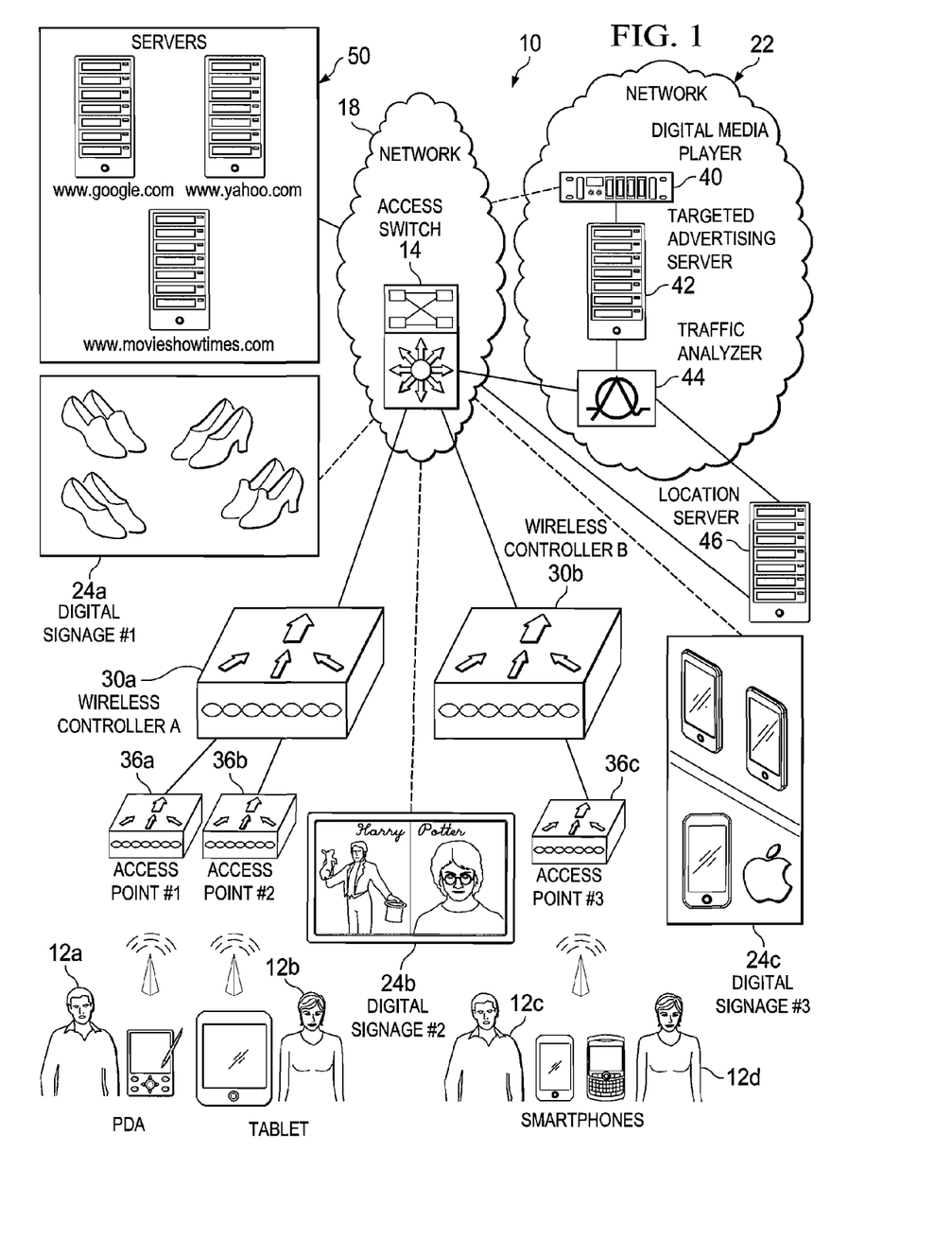
FIG. 1 is a simplified block diagram of a communication system for providing targeted advertising through traffic analysis in a network environment in accordance with one embodiment of the present disclosure.

Turning to FIG. 1, FIG. 1 is a simplified block diagram of a communication system 10 for providing advertising through traffic analysis in a network environment. FIG. 1 includes an access switch 14, a set of networks 18, 22, and several digital signage elements 24a-c. Additionally, FIG. 1 includes several end users 12a-d, who are operating different types of devices (e.g., a personal digital assistant (PDA), a tablet, smartphones, etc.). These devices are capable of achieving wireless connectivity to a given network in order to perform various internet activities such as initiating search queries, performing general web surfing, conducting media sessions, engaging in phone calls, etc. In one particular example, communication system 10 is associated with a retail environment, where various shoppers are present at a mall in which wireless connectivity can be achieved in any suitable manner.

FIG. 1 also includes a number of wireless controllers 30a-b and a number of access points 36a-c. Furthermore, communication system 10 can also include a digital media player 40, a targeted advertising server 42, a traffic analyzer 44, and a location server 46. FIG. 1 also includes a number of servers 50, which can represent search providers such as Google.com, Yahoo.com, etc., as well as business entities that may be queried for information (e.g., www.movieshowtimes.com, www.apple.com, etc.). In this particular example, servers 50 include web servers relegated for traffic destined for various hostnames (e.g., having various uniform resource locators (URLs) including Google.com, Yahoo.com, and movieshowtimes.com).

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, a 3G, a 3.5G, or a 4 G communication architecture applicable to a Global System for Mobile (GSM) environment in accordance with a particular embodiment of the present disclosure. Communication system 10 may also be configured to operate with any version of any suitable GPRS tunneling protocol.

In one embodiment, communication system 10 is configured to enable targeted advertising on digital signs by leveraging network equipment (e.g., access switch 14) to perform traffic analysis. For example, a shopping mall could have several video displays (i.e., digital signages 24a-c), which display advertisements for the consumers, who are present in the mall. These displays can be connected to network 18, through which they are controlled and managed (e.g., including dictating which content should be delivered, for which length of time, operating on a particular schedule, inclusive of animation, sound, video, multimedia, etc.). Communication system 10 can be configured to provide end users with relevant advertisements in the context of their spatial surroundings. Such relevant information can inform, influence, or otherwise affect the purchasing decisions of the end users.

Handheld devices such as iPhones, Google androids, Blackberrys, smartphones, etc., have the capability to connect to 802.11 wireless networks. Consumers can use their devices to obtain different kinds of information (product information, driving directions, restaurant location, etc.). In a mall, a consumer may be interested in identifying the stores having the best prices on a particular type of product or service, or identifying particular eating options, or identifying movie show times for nearby movie theaters.

Communication system 10 can intelligently evaluate this search activity in order to provide appropriate advertising. For example, as consumers search for specific types of information using their handhelds that may be connected to an 802.11 wireless network, communication system 10 can analyze their network traffic (e.g., search requests) and provide relevant advertisements/information on digital signages 24a-c. In operation, network traffic (e.g., wireless 802.11 traffic) from a consumer's handheld can be sent to a wireless controller, which is configured to convert this data into 802.3 data to be sent to access switch 14. Traffic could then be inspected at access switch 14, where an appropriate advertisement application could be used to deliver advertisements based on end user's internet activity. The advertisements being delivered to digital signages 24a-c could be relevant to the stores, restaurants, theaters, etc. at the mall.

Moreover, certain embodiments of the present disclosure can allow advertisements offered by search providers (e.g., Google, Yahoo, etc.) to take the advantage of the user's location, where relevant advertisements can be rendered (e.g., for nearby businesses that exist in the geographic vicinity of the end users). Hence, an end user's physical presence (particularly so in the context of the purchasing opportunities/retail stores, etc. in the mall) can be used to render real-time targeted advertisements to this consumer. Additionally, because the content providers for digital signages 24a-c represent business entities provided locally in the mall, the advertisements are more relevant, better directed, timely, and sensible. Logically, this translates into a greater probability that the relevant advertisements would influence shopping decisions. In this general sense, the advertisements are far more efficient than haphazardly rendering advertisements to crowds in a mall at arbitrary times.

It should also be noted that inspecting traffic is not burdensome or intrusive for the consumers to which the advertisements are being directed. Furthermore, such a protocol does not change (or necessarily manipulate) the content/web pages being delivered to end users 12a-d. Moreover, unwelcomed advertisements are not inserted into the web pages retrieved in response to the search query. This lack of web page manipulation could obviate the problems caused by injecting JavaScript into web pages that compromise security and stability issues for Hypertext Transfer Protocol (HTTP) traffic, Hypertext Markup Language (HTML) data, etc. Instead, intelligent and targeted business advertisements are rendered on digital signages 24a-c in the malls, where the users are theoretically making conscious buying decisions.

It should also be noted that the web-browsing activity of the users is not necessarily tracked (e.g., using persistent cookies). In contrast, communication system 10 is interested in searches that consumers perform within the vicinity of the mall. In one particular example, proximity-based advertising is ensured by targeting the user at the first hop in the network. For example, the position of access switch 14 at the 'first hop' of the network allows for an immediate identification of location information of the end user, compared to the content delivered by the search engines themselves. Hence, the architecture can identify, or otherwise understand, the precise geographic location of the user. The location information can be used to display advertisements of products or services available in the surrounding location of digital signages 24a-c.

Before turning to details associated with some of these potential operations, a brief discussion is provided about the infrastructure of FIG. 1.

End users 12a-d can be associated with clients, customers, or end users wishing to initiate a communication in communication system 10 via some network. In one particular example, end users 12a-d are simply individuals capable of generating network traffic. In more detailed examples, end users 12a-d can also be proximate (or soon to be proximate) to digital signages 24a-c. In certain timing scenarios, communication system 10 has the intelligence to predict (e.g., presuming a certain walking speed, a certain level of human traffic amongst individuals in a retail environment, a certain level of congestion in a retail environment, etc.) when end users 12a-d would arrive at certain locations at which digital signages 24a-c are present.

The term 'end user' is inclusive of devices used to initiate a communication, such as a computer, a personal digital assistant (PDA), a laptop or electronic notebook, a cellular telephone, an iPhone, a Blackberry, a smartphone, a tablet, an iPad, an IP phone, or any other device, component, element, or object capable of initiating voice, audio, video, media, or data exchanges within communication system 10. End users 12a-d may also be inclusive of a suitable interface to the human user, such as a microphone, a display, or a keyboard or other terminal equipment. End users 12a-d may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Figure 2:
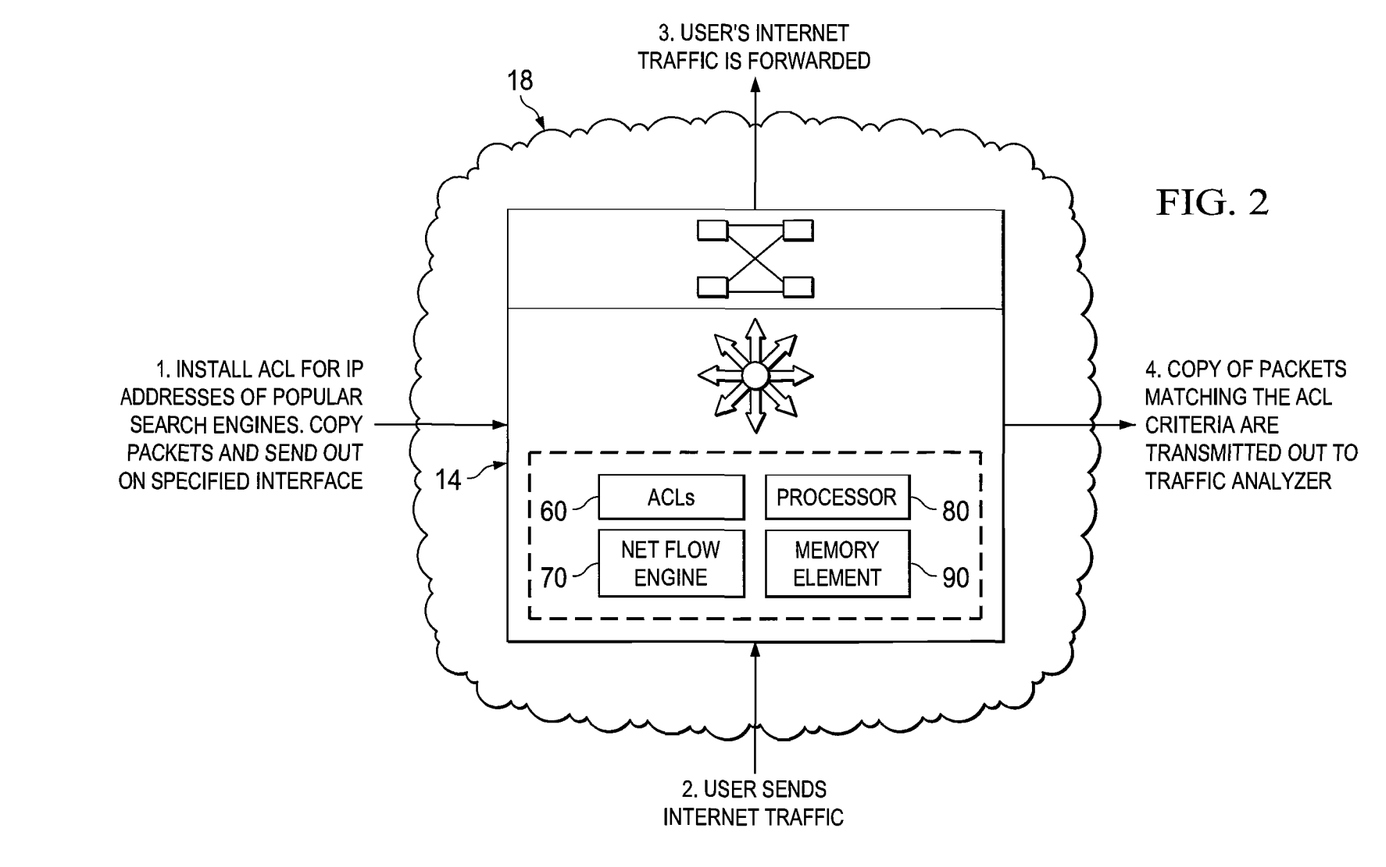
FIG. 2 is a simplified block diagram illustrating one potential configuration associated with the communication system.
Figure 3:
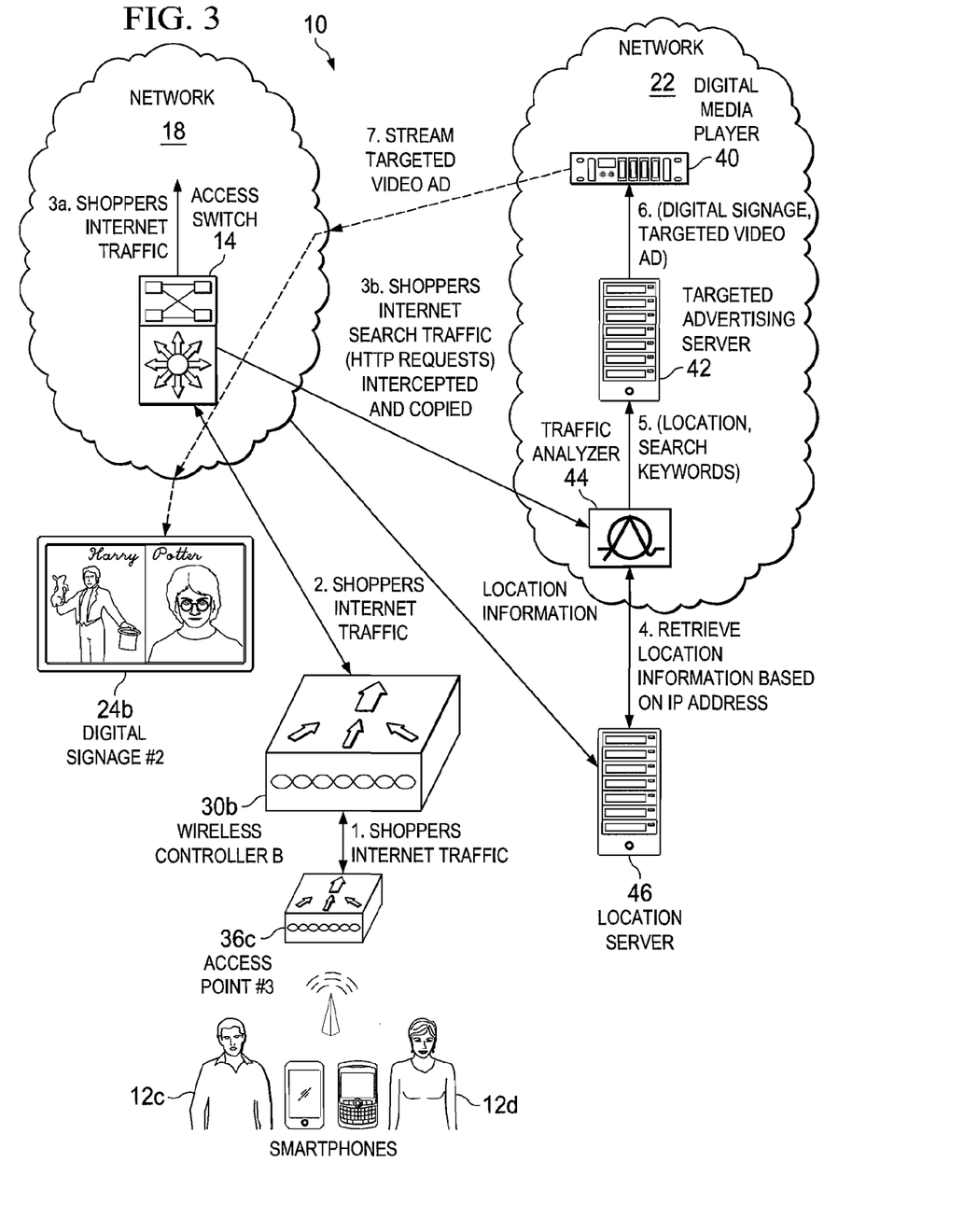
FIG. 3 is a simplified block diagram of another embodiment for providing targeted advertising through traffic analysis in a network environment.

Access switch 14 is an Ethernet switch capable of analyzing network traffic flowing through a given network in accordance with one embodiment of the present disclosure. [Note that as used herein in this Specification, the term 'network traffic' is meant to include Internet traffic, IP traffic, HTTP traffic, requests, search queries, packets, or any datagram associated with a network transmission.] Access switch 14 may be, more generally, any network element that receives end user flows associated with a given network (e.g., for networks such as those illustrated in FIGS. 1 and 3). As used herein in this Specification, the term 'network element' is meant to encompass routers, switches, gateways, bridges, loadbalancers, firewalls, servers, inline service nodes, proxies, processors, modules, or any other suitable device, component, element, or object operable to exchange information in a network environment. The network element may include appropriate processors, memory elements, hardware and/or software to support (or otherwise execute) the activities associated with providing targeted advertising based on traffic analysis, as outlined herein. Moreover, the network element may include any suitable components, modules, interfaces, or objects that facilitate the operations thereof. This may be inclusive of appropriate algorithms and communication protocols that allow for the effective exchange of data or information. Additional details associated with a possible internal structure of access switch 14 are provided below with reference to FIG. 2.

Access points 36a-c and wireless controllers 30a-b are communication interfaces between end users 12a-d and networks 18 and 22. The communication interface provided by access points 36a-c and wireless controllers 30a-b may allow data to be exchanged between end users 12a-d and any number of selected elements within communication system 10. Access points 36a-c and wireless controllers 30a-b may facilitate the delivery of a request packet generated by end users 12a-d and the reception of information sought by end users 12a-d. Access points 36a-c and wireless controllers 30a-b can be configured to tunnel, encrypt, decrypt, encapsulate, de-capsulate, secure (through any appropriate security protocol or mechanism), convert (as between protocols), NAT (network address translation), or otherwise process data packets propagating between end users 12a-d and access switch 14. Access points 36a-c and wireless controllers 30a-b represent only one example of possible communication interfaces between end users 12a-d and access switch 14. Other suitable types of communication interfaces may be used for any appropriate network design and these may be based on specific communication architectures.

Networks 18 and 22 represent a series of points or nodes of interconnected communication paths for receiving and transmitting packets of information that propagate through communication system 10. Networks 18 and 22 offers a communicative interface between end users 12a-d and access switch 14, and may be any local area network (LAN), Intranet, extranet, wireless local area network (WLAN), metropolitan area network (MAN), wide area network (WAN), virtual private network (VPN), or any other appropriate architecture or system that facilitates communications in a network environment. Networks 18 and 22 may implement a UDP/IP connection and use a TCP/IP communication protocol in particular embodiments of the present disclosure. However, networks 18 and 22 may alternatively implement any other suitable communication protocol for transmitting and receiving data packets within communication system 10. Networks 18 and 22 may foster any communications involving services, content, video, voice, or data more generally, as it is exchanged between end users 12a-d and various network elements.

Digital signages 24a-c are electronic services that offer a display at which data can be rendered for the end user. Note that as used herein in this Specification, the term 'digital display' is meant to connote any element that is capable of delivering image data (inclusive of text, audio, media, and video data) to an end user, who may be in proximity with digital signages 24a-c. This would necessarily be inclusive of any display, electronic billboard, panel, plasma element, television, signage monitor, computer interface, wall for projection activities, screen, TelePresence devices (inclusive of TelePresence boards, panels, screens, surfaces, etc.) or any other suitable element that is capable of delivering/rendering/projecting such information. Note also that the term 'image data' is meant to include any type of text, media, audio, or video (or audio-video) data applications (provided in any protocol or format) that could operate in conjunction with digital signages 24a-c.

Servers 50 can be associated with search engines (e.g., URLs) offering response content or services to any end user, or any group of end users. For example, servers 50 could be any network element associated with www.google.com, www.yahoo.com: both of which could offer response content for incoming search queries. Alternatively, servers 50 can be any destination, location, or node that is sought to be accessed or used by end users 12a-d. Servers 50 may provide the requested data/service/content, or provide a portal, pathway, or gateway to another location that includes the desired data. In other embodiments, servers 50 could simply be a data storage location or a processor that can store or deliver content or services to one or more end users 12a-d.

FIG. 2 is a simplified block diagram associated with one example internal structure of access switch 14. Access switch 14 may be indicative of an aggregation point through which traffic can flow from various access points. Multiple end users may be seeking to access various search engines, where their search traffic may pass through access switch 14. Access switch 14 may include access control lists (ACLs) 60, a net flow engine 70, a processor 80, and a memory element 90. In one example implementation, access switch 14 of FIG. 2 implements a NetFlow protocol (e.g., through net flow engine 70) for aggregating, analyzing, and/or otherwise collecting IP traffic information. For example, the NetFlow protocol can be used when exporting information about the collected traffic. Each network device can generate particular records, which can be exported from the network element (e.g., in user datagram protocol (UDP), stream control transmission protocol (SCTP), etc.).

Before detailing the processing that occurs at access switch 14, it is important to note how a given ACL can be provisioned. In more general terms, individual servers, switches, routers, etc. can have network ACLs. Access control lists can be configured to control/monitor both inbound and outbound traffic. In a general sense, ACLs 50 represent commands used to filter packets on network elements (e.g., routers, switches, etc.) based on the source IP address of the packet, or on the destination IP addresses.

In operation of one particular example, consider wireless traffic (originating from end user 12b) being diverted from wireless controller 30a to access switch 14. Net flow engine 70 can be configured to classify the traffic flowing through access switch 14 into flows based on fields in the packet (source IP address, destination IP address, TCP port, etc.). By provisioning rules into net flow engine 70 (e.g., for IP addresses of popular search destinations such as www.google.com, search.yahoo.com, etc.) access switch 14 can identify the initial HTTP requests for these destinations. The initial packets commonly contain the user-requested search terms (or keywords) in the URL itself (i.e., HTTP GET) or in the packet (i.e., HTTP POST). These keywords can be extracted from the packets and, subsequently, advertising content relevant to these keywords can be delivered on the digital signages.

For example, if shoppers searched for movie times for Harry Potter at the Grand Century Shopping Mall, these keywords can be extracted, where the relevant advertising information can be rendered on digital signage 24b. Similarly, if shoppers searched for the best deals on cellular phones at Westgate Mall, the architecture can analyze these keywords and, subsequently, display advertisements associated with businesses that relate to these keywords (e.g., an AT&T store offering cellular telephones, at an Apple store offering iPhones, etc.). The advertisement can be rendered on digital signages close to the particular end users that initiated the search queries (e.g., digital signage 24c).

In one implementation, access switch 14 includes software to achieve (or to foster) the traffic analysis operations, as outlined herein in this document. Note that in one example, access switch 14 can have an internal structure (e.g., with a processor, a memory element, etc.) to facilitate some of the operations described herein. In other embodiments, all of these traffic analysis features may be provided externally to this element or included in some other network element to achieve this intended functionality. Alternatively, access switch 14 includes this software (or reciprocating software) that can coordinate with other elements in order to achieve the operations, as outlined herein. In still other embodiments, a given network element (e.g., access switch 14) may include any suitable algorithms, hardware, software, components, modules, interfaces, or objects that facilitate the operations thereof.

In addition to illustrating one possible example internal structure of access switch 14, FIG. 2 also includes a general flow associated with a particular operational example. ACLs 50 can be provisioned for particular search engines, as reflected by Step 1 of FIG. 2. ACLs 50 can be systematically accessed in order to properly evaluate incoming search traffic emanating from a set of end users. In this particular example, an ACL has been installed for IP addresses associated with popular search engines (e.g., identify a match for (DestIP=<Google/Yahoo/AOL IP> Dest TCP=80)). Note that a particular port (e.g., port 80) has also been designated at this juncture. If packets match a particular ACL, those packets can be systematically analyzed (as described below) to identify appropriate advertising, which targets the end user(s) that initiated the search query. Additionally, packets can be copied and sent out on a specified interface in Step 1. The first few packets of the HTTP session can include HTTP GET/POST requests with search keywords included in them in this particular example.

At Step 2, network traffic associated with a particular end user is received by access switch 14. In this particular example, a search is being performed for blue jeans manufactured by the GAP, where the end user is using Google as his search engine. At Step 3 of FIG. 2, the end user's Internet traffic is forwarded along to its appropriate next destination. Thus, the system is continuously receiving the Internet traffic (e.g., inclusive of possibly receiving a copy of this traffic) that is being sent to particular search engines (e.g., Google.com in this particular instance). In one particular example, the packets from the search query can be captured by net flow engine 70, which communicates (e.g., redirects) these packets to an interface for traffic analyzer 44 to process. Hence, a copy of packets matching the ACL criteria is transmitted from access switch 14 to an appropriate processing mechanism, as is illustrated by Step 4.

Note that in a NetFlow-based scenario, a number of advantages could be achieved. For example, while an ACL-based solution replicates the traffic that takes place at the configured interface, a NetFlow-based solution has a capability to relay a specified number of packets for each flow. Since search terms are typically sent across to the search engine in the first few packets (e.g., HTTP GET/HTTP POST), the NetFlow scenario can significantly reduce the amount of packet replication to the configured interface. This will improve scalability of a deployment.

Returning to the previous flow of FIG. 2, in this particular instance, traffic analyzer 44 can identify the search terms 'GAP' and 'blue jeans.' Concurrently, as this process is occurring, location server 46 can relay the position of the end user that initiated the search query. Based on the user being present (e.g., at the local mall at which digital signage elements are resident), a determination can be made as to which advertising would be appropriate for this particular end user based on the search query. Subsequently, suitable advertising can be rendered on digital signage elements 24a-c for this particular user to view. For example as this end user is walking through the mall, he would see a GAP advertisement and, further, blue jeans being offered at the GAP.

It should also be noted that the keywords can be used to render relevant advertising, but usage of the term 'relevant' in this Specification is meant to include not only relevance in matching product and service offerings to keywords, but also relevance in a marketing context. Hence, relevance for the term 'blue jean' would not be strictly correlated to products or services that match the identical keyword 'blue jean.' For example, if a given end user generated a search query associated with blue jeans, that end user may see advertisements associated with blue jeans and, further, associated with belts, or shirts that may coordinate well with blue jeans. Hence, ancillary product and service offerings can be served to the end user via digital signage 24a-c. Similarly, if a given end user used more generic terminology (e.g., searched for 'desserts'), he may see rendered digital advertisements for restaurants more generally. Anticipating how the actual consumer buying decisions might be executed can be left up to marketers, and/or to those individuals who have invested time and resources in order to identify consumer behavior, buying preferences, consumption patterns, etc.

Note that there can be many users searching for different items, where digital signages would be configured to cater to all shoppers universally. Hence, the architecture can employ a ranking system of the search keywords based on popularity and, subsequently, deliver appropriate content. Further, the architecture can also control the screen real estate corresponding to the popularity of the search keywords. For example, a certain portion of the digital signage (e.g., 50%) may be relegated to the top keyword found in recent searches (e.g., over a configurable time period). The remaining portions of the digital signage can be occupied by several other popular search terms, where these search terms can be spread out over the digital signage. In another example implementation, the top three keywords can trigger that the digital signage should render advertisements equally (in thirds) across the distributable space of the digital signage. Hence, one third of the digital signage could be associated with a movie trailer, while a second third of the digital signage may be associated with Nike shoes, and a third portion of the digital signage could be advertising Apple iPhones. Thus, the present disclosure can accommodate a scalable use of screen real estate based on the popularity of the content. Any suitable permutations of these possible apportionments or delegations of advertising space are clearly within the broad scope of the present disclosure.

In one particular example, data mining technologies can be employed to extract information about user demographics. In one particular implementation, the search keywords can be used to identify demographics. For example, a search query associated with high-heeled shoes and makeup would draw an inference that the end user is either a female, or is shopping for a female such that advertisements directed toward women (or products to be consumed by women) would be more appropriate for the digital signage. Hence, this data mining helps deliver more relevant and targeted content on the digital signages.

In other instances, energy conservation can be achieved in monitoring network traffic through access switch 14. Hence, a possible power savings can be achieved through turning off digital signages in areas of no internet activity. For example, when no traffic is present at access switch 14, video walls, digital signage displays, air-conditioning units, lighting fixtures, etc. can be turned down (e.g., in a hibernating or sleep mode), dimmed, or turned off. The lack of traffic at access switch 14 would imply that no users are in the vicinity and, therefore, energy expenditures should be minimized. There could be an assumption that certain wireless traffic from users may systematically be propagating in the network (e.g., keep-alive traffic from applications such as Skype, etc.). However, factoring these applications out, energy conservation practices can still be executed for energy consuming devices.

Figure 4:
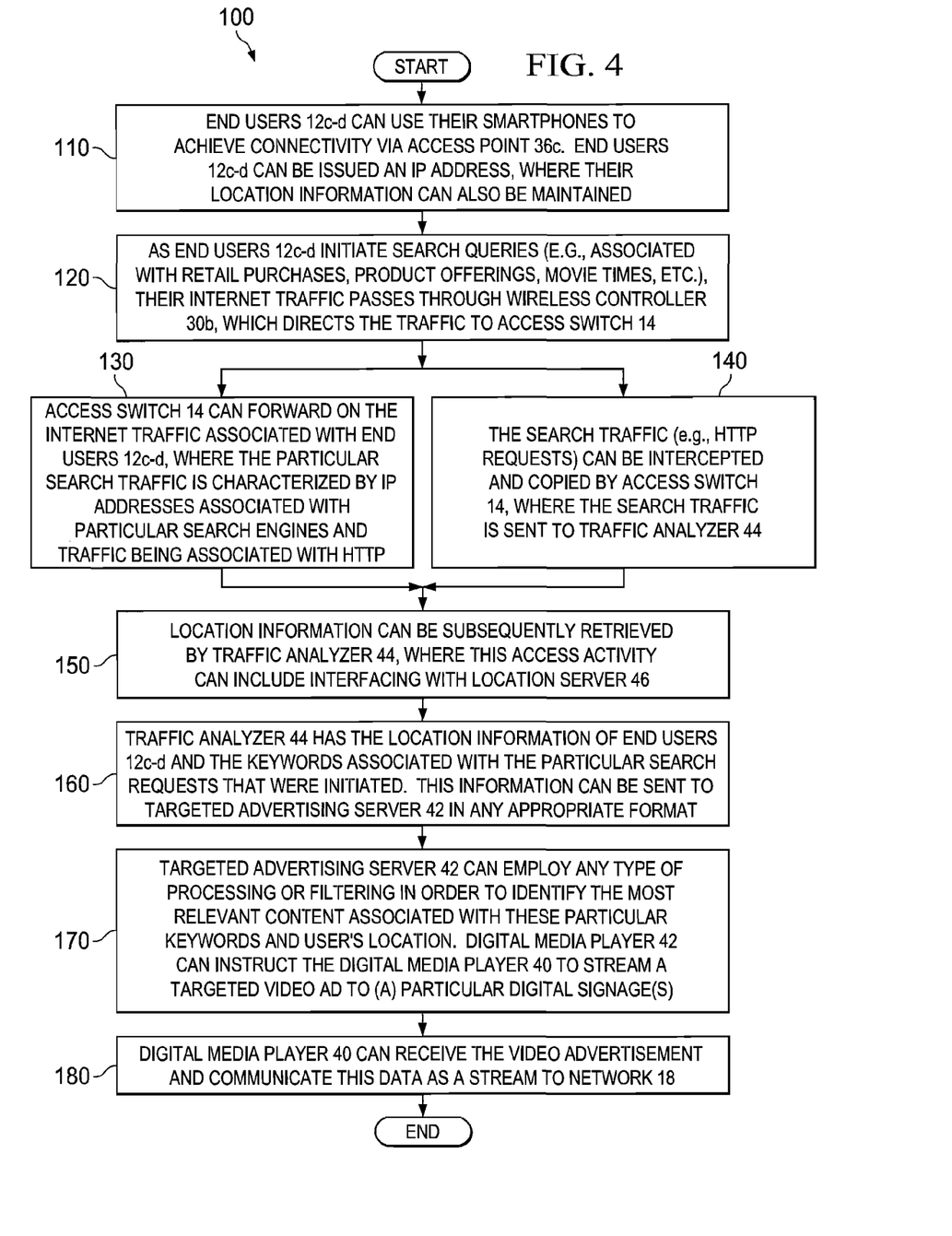
FIG. 4 is a simplified flow diagram illustrating example operations associated with the communication system.

FIG. 3 is a simplified block diagram illustrating one possible implementation associated with communication system 10. A number of steps are provided in this particular illustration, where FIG. 4 further tracks these operations in detail. FIG. 4 is a simplified flowchart 100 illustrating one set of example steps associated with the architecture of FIG. 3. Note that because these figures are related, they are discussed together. Turning to Step 1 of FIG. 3, end users 12c-d can use their smartphones to achieve some connectivity via access point 36c. As part of their session establishment, end users 12c-d can be issued an IP address, where their location information can also be maintained (e.g., at location server 46). For example, each end user 12c-d can be linked to a particular access point (e.g., access point 36c). This is reflected by step 110 of FIG. 4. End users 12c-d can be navigating through a shopping environment (e.g., any type of retail or services environment in which advertising could be applicable). As end users 12c-d initiate search queries (e.g., associated with retail purchases, product offerings, movie times, etc.), that Internet traffic passes through wireless controller 30b, which directs this traffic to access switch 14 (as shown in Step 2). This is also depicted in step 120 of FIG. 4.

Access switch 14 can forward on the Internet traffic associated with end users 12c-d, as depicted at Step 3a. This is also depicted in step 130 of FIG. 4. Note that this particular search traffic is characterized by IP addresses associated with particular search engines (e.g., particular web servers), as well as this traffic being associated with HTTP. Hence, a given ACL that is provisioned within access switch 14 can match IP addresses associated with search engines to identify if this traffic is relevant for potential advertising targeted to end users 12c-d. The search traffic (e.g., HTTP requests) can be received (e.g., intercepted and copied) by access switch 14, where the search traffic is sent to traffic analyzer 44, as shown in Step 3b. This is also depicted in step 140 of FIG. 4. [Note that the term 'receiving' as used herein in this Specification can include (but is not limited to) activities associated with reception, obtaining, intercepting, collecting, or otherwise being given some object in the network (e.g., packets).]

Location information can be subsequently retrieved by traffic analyzer 44, where this access activity can include interfacing with location server 46 (as shown in Step 4). This may include traffic analyzer 44 identifying an IP address within the search query such that the IP address can be correlated to particular end users 12c-d by location server 46. This is illustrated by step 150 of FIG. 4. In addition, traffic analyzer 44 can evaluate the particular search traffic to identify keywords in the searches initiated by the end users 12c-d. Thus, at this juncture, traffic analyzer 44 has the location information of end users 12c-d and the keywords associated with the particular search requests that were initiated.

This information can be sent to targeted advertising server 42 in any appropriate format (e.g., in a tuple configuration, and a proprietary format, etc.), as shown in Step 5. This is also illustrated in step 160 of FIG. 4. Targeted advertising server 42 can employ any type of processing or filtering in order to identify the most relevant content associated with these particular keywords and the user's location. Targeted advertising server 42 can send a targeted video advertisement to digital media player 40, as shown in Step 6. Digital media player 40 may also request the precise digital signage to which the targeted advertisement is being streamed. This is also illustrated by step 170 of FIG. 4.

Note that, in particular embodiments, the location information of the user can play a role in deciding the relevant content delivered. For example, if a user performs a search query for the keywords 'deals on shoes' from the third floor of a shopping mall, then the content selection methodology should consider stores on the third floor of the mall, and the nearby floors, which would be more relevant in comparison to the stores that are geographically farther.

Digital media player 40 can subsequently communicate a targeted video advertisement stream to network 18, as shown in Step 7. This is also illustrated by step 180 of FIG. 4. For example, if the search query were associated with movie times, the targeted video advertisement stream could render movie trailers on digital signage 24b. Hence, an intelligent advertising distribution decision could be made to influence, inform, or otherwise affect purchasing decisions of end users 12c-d.

It should be noted that Steps 4-6 are based on particular infrastructure associated with a given architecture. That infrastructure can be modified, altered, or otherwise changed without departing from the broad teachings of the present disclosure. For example, traffic analyzer 44 could be consolidated with access switch 14, or targeted advertising server 42 can be consolidated with digital media player 40. There is considerable flexibility in the tendered architectures, where any such consolidation may be based on particular communication needs.

Note that there is also value in offering the keyword information to other search services such as Google, Yahoo, etc. A simple communication involving access switch 14 (or any other appropriate network element) can be used to accommodate such a feature. Additionally, access switch 14 can also harvest (or otherwise receive) traffic that indicates how the end users carried out their purchases after seeing the rendered advertisements. Indeed, in such a deployment, traffic (of multiple users) that passes through access points in the vicinity of the stores (that were advertised in the delivered targeted advertisements) after the content was played on the signage, could provide an indication of the effectiveness of the advertisement. In this general sense, the effectiveness (i.e., efficiency metric) of the advertisement can be measured. Other components (e.g., proprietary elements, access switches, routers, etc.) can be used to identify (or infer) what occurred as a result of the advertisement rendered on the digital signage.

Note that in certain example implementations, the traffic analysis functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 2] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, access switch 14 includes software in order to achieve the traffic analysis functions outlined herein. These activities can be facilitated by net flow engine 70, ACLs 60, processor 80, etc. Access switch 14 can include memory elements for storing information to be used in achieving the intelligent traffic analysis operations, as outlined herein. Additionally, each of these devices may include a processor that can execute software or an algorithm to perform the traffic analysis activities, as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, table, cache, key, etc.) should be construed as being encompassed within the broad term 'memory element.' Similarly, any of the potential processing elements, modules, and machines described in this Specification should be construed as being encompassed within the broad term 'processor.' Each network element of FIG. 1 (e.g., access switch 14) can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular retail environments, communication system 10 may be applicable to any system in which network traffic (e.g., inclusive of search queries) can be evaluated in order to render relevant (or targeted) information for a particular user group. This could apply to corporate scenarios, where a certain group of people (e.g., involved in some training lecture, a continuing education seminar, etc.) are utilizing their computing devices to generate network traffic, which can be used as a basis for rendering relevant information locally to these end users. For example, if a speaker at a conference used the term 'deep packet inspection' and the network traffic of the audience members revealed some searching for a definition associated with 'deep packet inspection' then local electronic displays could simply show a definition of this terminology, or a link to an IEEE standard, etc.

Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
receiving, at a network element having a processor and a memory element, packets associated with network traffic, wherein at least a portion of the packets include search terms entered by a user;
identifying location information associated with a device related to the network traffic by analyzing the received packets, wherein the location information indicates that the device has entered a predetermined geographic vicinity;
extracting keywords from the search terms;
selecting an advertisement that is related to the keywords and is related to at least one business that is located in the geographic vicinity; and
displaying the advertisement on digital signage that is physically separate from the device but is proximate to a current geographic location of the device, wherein the current geographic location of the device is at least partially based on the location information.

2. The method of claim 1, further comprising:
evaluating whether the network traffic is associated with internet activity initiated by the device; and
copying at least some of the packets for extracting the keywords.

3. The method of claim 1, further comprising:
classifying the network traffic based on fields in the packets, wherein the fields include a source IP address, a destination IP address, and a transmission control protocol (TCP) port.

4. The method of claim 1, wherein the network traffic is hypertext transfer protocol (HTTP) requests originating from the device, wherein the device is operated by the user, and wherein demographic data associated with the user is identified in the network traffic.

5. The method of claim 1, further comprising:
receiving additional network traffic at the network element; and
identifying an efficiency metric for the advertisement based, at least in part, on the received additional network traffic.

6. The method of claim 1, wherein a ranking system is used to determine popularity associated with particular keywords in order to identify the advertisement to be rendered on the digital signage.

7. The method of claim 1, wherein a predetermined number of packets of the network traffic that match data in an access control list are copied.

8. The method of claim 1, wherein a popularity of particular keywords is used to determine the position of a plurality of advertisements on the digital signage.

9. The method of claim 1, further comprising:
identifying search engine traffic in the network traffic, wherein the search engine traffic is identified by matching uniform resource locators included in the network traffic against an access control list that is configured with uniform resource locators of search engines, and wherein the keywords are extracted from the search engine traffic.

10. Logic encoded in one or more non-transitory media that includes code for execution and when executed by a processor operable to perform operations comprising:
receiving packets associated with network traffic, wherein at least a portion of the packets include search terms entered by a user;
identifying location information associated with a device related to the network traffic by analyzing the received packets, wherein the location information indicates that the device has entered a predetermined geographic vicinity;
extracting keywords from the search terms;
selecting an advertisement that is related to the keywords and is related to at least one business that is located in the geographic vicinity; and
displaying the advertisement on digital signage that is physically separate from the device but is proximate to a current geographic location of the device, wherein the current geographic location of the device is at least partially based on the location information.

11. The logic of claim 10, the operations further comprising:
evaluating whether the network traffic is associated with internet activity initiated by the device; and
copying at least some of the packets for extracting the keywords.

12. The logic of claim 10, the operations further comprising:
classifying the network traffic based on fields in the packets, wherein the fields include a source IP address, a destination IP address, and a transmission control protocol (TCP) port.

13. The logic of claim 10, wherein additional network traffic is received at a network element in order to identify an efficiency metric for the advertisement.

14. The logic of claim 10, wherein a ranking system is used to determine popularity associated with particular keywords in order to identify the advertisement to be rendered on the digital signage.

15. An apparatus, comprising:
a memory element configured to store data,
a processor operable to execute instructions associated with the data, and
a net flow engine, wherein the processor, the net flow engine, and the memory element cooperate in order to:
receive packets associated with network traffic, wherein at least a portion of the packets include search terms entered by a user;
identify location information associated with a device related to the network traffic by analyzing the received packets, wherein the location information indicates that the device has entered a predetermined geographic vicinity;
extract keywords from the search terms;
select an advertisement that is related to the keywords and is related to at least one business that is located in the geographic vicinity; and
display the advertisement on digital signage that is physically separate from the device but is proximate to a current geographic location of the device, wherein the current geographic location of the device is at least partially based on the location information.

16. The apparatus of claim 15, wherein the network traffic is evaluated to determine whether it includes a search request initiated by the device, and wherein at least some of the packets are copied in order to extract the keywords.

17. The apparatus of claim 15, wherein the net flow engine is further configured to:
classify the network traffic based on fields in the packets, wherein the fields include a source IP address, a destination IP address, and a transmission control protocol (TCP) port.

18. The apparatus of claim 15, wherein the network traffic is hypertext transfer protocol (HTTP) requests originating from the device, wherein the device is operated by the user, and wherein demographic data associated with the user is identified in the network traffic.

19. The apparatus of claim 15, wherein the net flow engine is further configured to:
receive additional network traffic at a network element; and
identify an efficiency metric for the advertisement based, at least in part, on the received additional network traffic.

20. The apparatus of claim 15, wherein a ranking system is used to determine popularity associated with particular keywords in order to identify the advertisement to be rendered on the digital signage.

21. The apparatus of claim 15, wherein space allocation on the digital signage are correlated to popularity associated with specific content being rendered on the digital signage.

22. The apparatus of claim 15, wherein power is reduced for the digital signage based on a level of internet activity.

23. The apparatus of claim 15, wherein the apparatus is a network element configured to identify the location information associated with the device.

* * * * *